United States Patent [19]

Nishizawa

[11] 4,380,791
[45] Apr. 19, 1983

[54] ELECTRICALLY CONTROLLED ADDITIVE LAMP HOUSING FOR OPTICAL PRINTING

[75] Inventor: Masayuki Nishizawa, Koshigaya, Japan

[73] Assignee: Hoei Sangyo Kabushiki Kaisha, Japan

[21] Appl. No.: 267,413

[22] Filed: May 26, 1981

[30] Foreign Application Priority Data

Jun. 3, 1980 [JP] Japan ................................. 55-75137

[51] Int. Cl.³ .......................... F21V 9/08; F21V 7/04; F21V 5/04; F21V 13/12
[52] U.S. Cl. ..................................... 362/231; 362/32; 362/230; 362/268; 362/293
[58] Field of Search ................. 362/32, 230, 231, 268, 362/293

[56] References Cited

U.S. PATENT DOCUMENTS

| 4,071,809 | 1/1978 | Weiss et al. | 362/268 |
| 4,337,502 | 6/1982 | Lescrenier | 362/268 |
| 4,338,654 | 7/1982 | Logothetis | 362/268 |

Primary Examiner—Irwin Gluck
Attorney, Agent, or Firm—Steinberg & Raskin

[57] ABSTRACT

First, second and third dichroic filters are positioned at corresponding ones of first, second and third light sources for deriving red, green and blue beams, respectively, from the light sources. A beam guide member has first, second and third branched bundles and a main bundle composed of the first, second and third branched bundles. Each branched bundle has an end surface at which a corresponding one of the beams derived from the dichroic filters is provided. The main bundle has an end surface for emitting the beams. A light quantity control circuit controls the quantities of light of the light sources.

9 Claims, 4 Drawing Figures

ELECTRICALLY CONTROLLED ADDITIVE LAMP HOUSING FOR OPTICAL PRINTING

BACKGROUND OF THE INVENTION

The present invention relates to an additive lamp housing for optical printing. More particularly, the invention relates to an additive lamp housing suited for optically printing movie films in color.

An additive lamp housing of known type is shown in FIG. 1. In this lamp housing, although only one lamp is required as a source of light, a complicated optical system must be incorporated in the lamp housing and very strict precision must be maintained. Furthermore, since the light is polarized and is reflected by dichroic mirrors and cold mirrors, the irregularly reflected light results in color shading on the printed surface. Also, since the light rays or beams are dimmed by light valves, color shading develops between the central portion and the peripheral portion of the printed picture.

SUMMARY OF THE INVENTION

An object of the invention is to provide an additive lamp housing which develops very little color shading on the printed surfaces.

Another object of the invention is to provide an additive lamp housing which automatically and correctly maintains balance among the three primary color light beams by electrically dimming light quantities from the light source.

Still another object of the invention is to provide an additive lamp housing of simple structure which eliminates the plurality of dichroic mirrors, cold mirrors, condensers and light valves which complicate known optical systems.

The optical system of the invention eliminates the defects and disadvantages of the known lamp housing. Generally speaking, the lamp housing of the invention includes separate sources of light for red, green and blue and the quantity of light from each of the sources of light is electrically controlled. The beams from the sources of light are fed via dichroic filters to a beam guide member having a bundle of flexible optical fibers. The beams or rays of the three primary colors are emitted evenly and in a random manner from the end of the beam guide member.

In accordance with the invention, an additive lamp housing comprises first, second and third light sources. First, second and third dichroic filters are positioned at corresponding ones of the light sources for deriving red, green and blue beams, respectively, from the light sources. A beam guide member has first, second and third branched bundles and a main bundle composed of the first, second and third branched bundles. Each branched bundle has an end surface at which a corresponding one of the beams derived from the dichroic filters is provided. The main bundle has an end surface for emitting the beams. A light quantity control circuit controls the quantities of light of the light sources.

The beam guide member consists of a plurality of optical fibers in a main bundle and three branched bundles. The optical fibers are glass, glass with a quartz core, or plastic.

In a preferred embodiment, the end surface of the main bundle consists of sets of three optical fibers guided from the first, second and third branched bundles, respectively. The end surfaces of the set of optical fibers are arrayed in a random fashion.

The light quantity control circuit has a light quantity monitoring sensor circuit, a preset concentration trimming circuit and an operation circuit for each of the light sources, and controls the quantity of light from each of the light sources.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
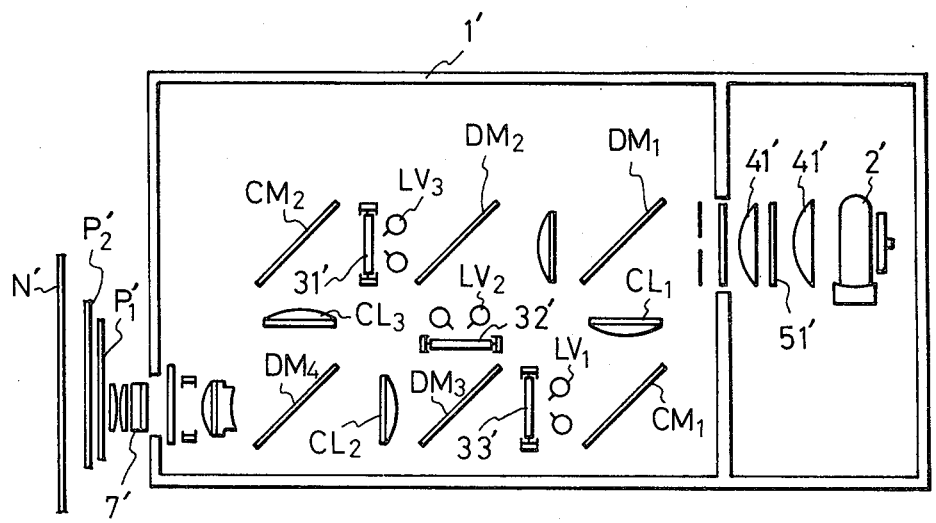
FIG. 1 is a schematic diagram of a known additive lamp housing.

The known lamp housing shown in FIG. 1 includes an incandescent lamp $2'$ which serves as a source of light. Two dichroic mirrors $DM_1$ and $DM_2$ divide a single beam of light into three primary colors. Neutral density filters $31'$, $32'$ and $33'$ provide for coarse setting of each primary color for color balancing purposes. Cold mirrors $CM_1$ and $CM_2$, condenser lenses $CL_1$, $CL_2$ and $CL_3$, and dichroic mirrors $DM_3$ and $DM_4$ collect the three primary colors into a single beam of light so that such beam may be used as a source of light for printing. The beams or rays of the three primary colors are dimmed by opening or closing three light valves $LV_1$, $LV_2$ and $LV_3$ which are provided for each of the light components, respectively.

Figure 2:
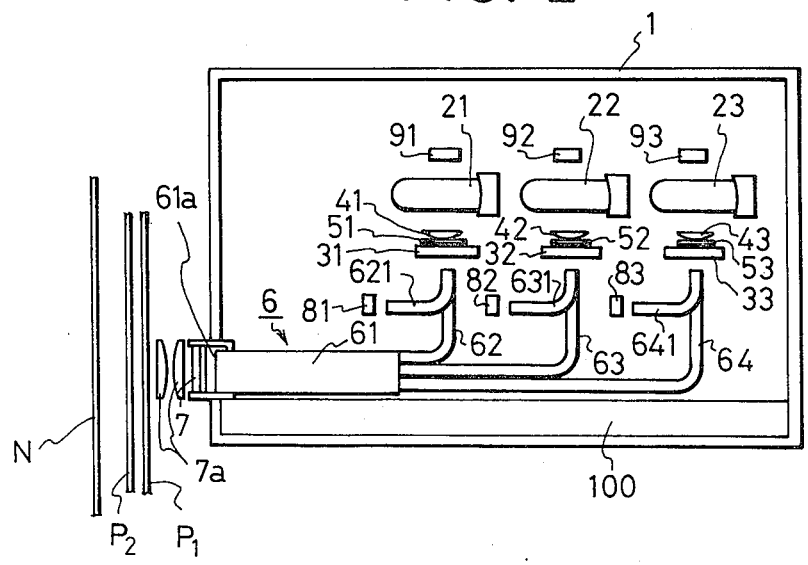
FIG. 2 is a schematic diagram of an embodiment of the additive lamp housing of the invention.

FIG. 2 shows an embodiment of the additive lamp housing of the invention. The lamp housing of FIG. 2 includes a lamp housing casing 1 and light sources 21, 22 and 23 such as, for example, 500 watt halogen lamps. Blue light is derived from the light source 21 via a suitable dichroic filter 31. Green light is derived from the light source 22 via a suitable dichroic filter 32 and red light is derived from the light source 23 via a suitable dichroic filter 33. Condenser lenses 41, 42 and 43 and heat-preventing filters 51, 52 and 53, as required, are interposed between the light sources or lamps 21, 22 and 23 and the dichroic filters 31, 32 and 33, respectively, at right angles with the light beams from said lamps.

A beam guide member 6, such as, for example, a light conduit, has a bundle of flexible optical fibers, consisting, for example, of several tens of thousands to several hundreds of thousands of optical glass fibers bundled together. A main bundle 61 has an end surface or base portion 61a at which the optical glass fibers are so cut as to be substantially planar. The end surface 61a emits the light and is adjacent a fixed condenser lens 7. The other end of the main bundle 61 is formed into three branched bundles 62, 63 and 64 to collect the light. Similarly to the end surface 61a of the main bundle 61, the optical fibers at the tips of the branched bundles 62, 63 and 64 are so cut as to be substantially planar. The tips of the branched bundles 62, 63 and 64 are positioned adjacent the light source lamps 21, 22 amd 23 and dischroic filters 31, 32 and 33, respectively, are positioned at said tips to collect the beams.

Guide bundles 621, 631 and 641 are provided for monitoring pruposes and are derived or branched from a portion of the optical fibers of the branched bundles 62, 63 and 64, respectively. The guide bundles 621, 631 and 641 guide portions of the beams from the light sources to optical sensors 81, 82 and 83, respectively. The sensors 81, 82 and 83 preferably comprise silicon blue cells. Heat sensors 91, 92 and 93 are disposed adjacent the lamps 21, 22 and 23, respectively, to detect the temperature of said lamps. The heat sensors 91, 92 and 93 preferably comprise thermocouples.

A substrate 100 incorporates electric circuits such as, for example, light quantity control circuits for each of the lamps, temperature detecting circuits, cooling fan control circuits and operation circuits. Transparent positive films $P_1$ and $P_2$ are of originals that are to be synthesized, and a negative film N is to be printed. A condenser lens 7a is positioned between the end surface 61a of the main bundle 61 and the positive film $P_1$. When the pictures are not to be synthesized, either of the positive films $P_1$ and $P_2$ is used.

Figure 3:
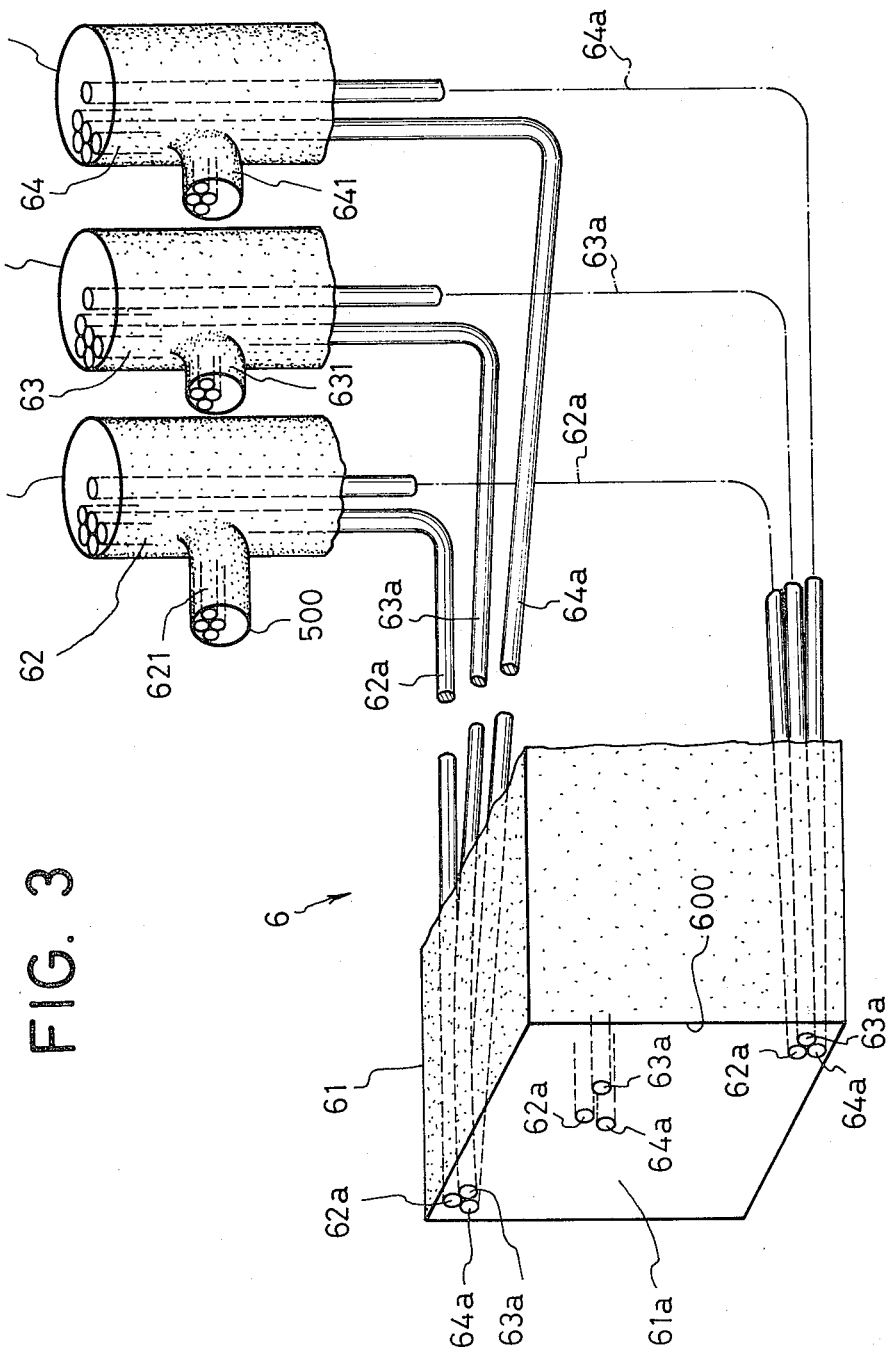
FIG. 3 is a perspective view, on an enlarged scale, of an embodiment of the beam guiding member of the lamp housing of the invention.

FIG. 3 illustrates, on an enlarged scale, the beam guide member 6. As shown in FIG. 3, the end surface 61a of the main bundle 61 consists of end surfaces of sets of optical fibers 62a, 63a and 64a, arrayed in a random fashion. Each set of optical fibers is composed of three optical fibers 62a, 63a and 64a drawn from the branched bundles 62, 63 and 64, respectively. The optical fibers may comprise, for example, glass fibers, glass fibers having quartz cores, or plastic fibers. Quartz and glass fibers are superior to plastic fibers in some respects. More particularly, quartz and glass fibers are resistant to chemicals and humidity, and exhibit a high light transmission factor. Furthermore, quartz and glass fibers have wide transmission wavelength regions and do not lose the transmission factor, even when they are in use for extended periods of time. On the other hand, plastic fibers may be inexpensively produced, easily bent, and their end portions may be more easily finished than those of glass fibers.

In accordance with the invention, if the fibers are glass, they should have a diameter of from 2 to 6300 $\mu$m, and if the fibers are plastic, they should have a diameter of from 75 to 2500 $\mu$m. The diameter of the fibers does not have any serious relation to the light transmission factor. However, attention should be directed to the fact that the light leaks if the diameter of the fibers is smaller than the wavelength of the light and if the neighboring fibers are not separated from each other by a distance greater than the wavelength of the light. That is, the quantity of light transmitted through the fibers is determined by the areas of the light transmitting portions, the finished condition of the end surfaces, reflection losses, and absorption and scattering in the fibers. This must therefore be taken into consideration in designing the light quantity control circuit hereinafter described.

In the illustrated embodiment of the invention, 150,000 flexible glass fibers, each having a diameter of 13 $\mu$m, are bundled together to form the main bundle 61. Therefore, 50,000 glass fibers 62a, 63a and 64a are bundled together to form each of the branched bundles 62, 63 and 64. The main bundle 61 and the branched bundles 62, 63 and 64 are covered by a protective sheath 600 of polyvinyl chloride. The sheath 600 is thermally shrunk at its end portions to firmly retain the fibers.

Figure 4:
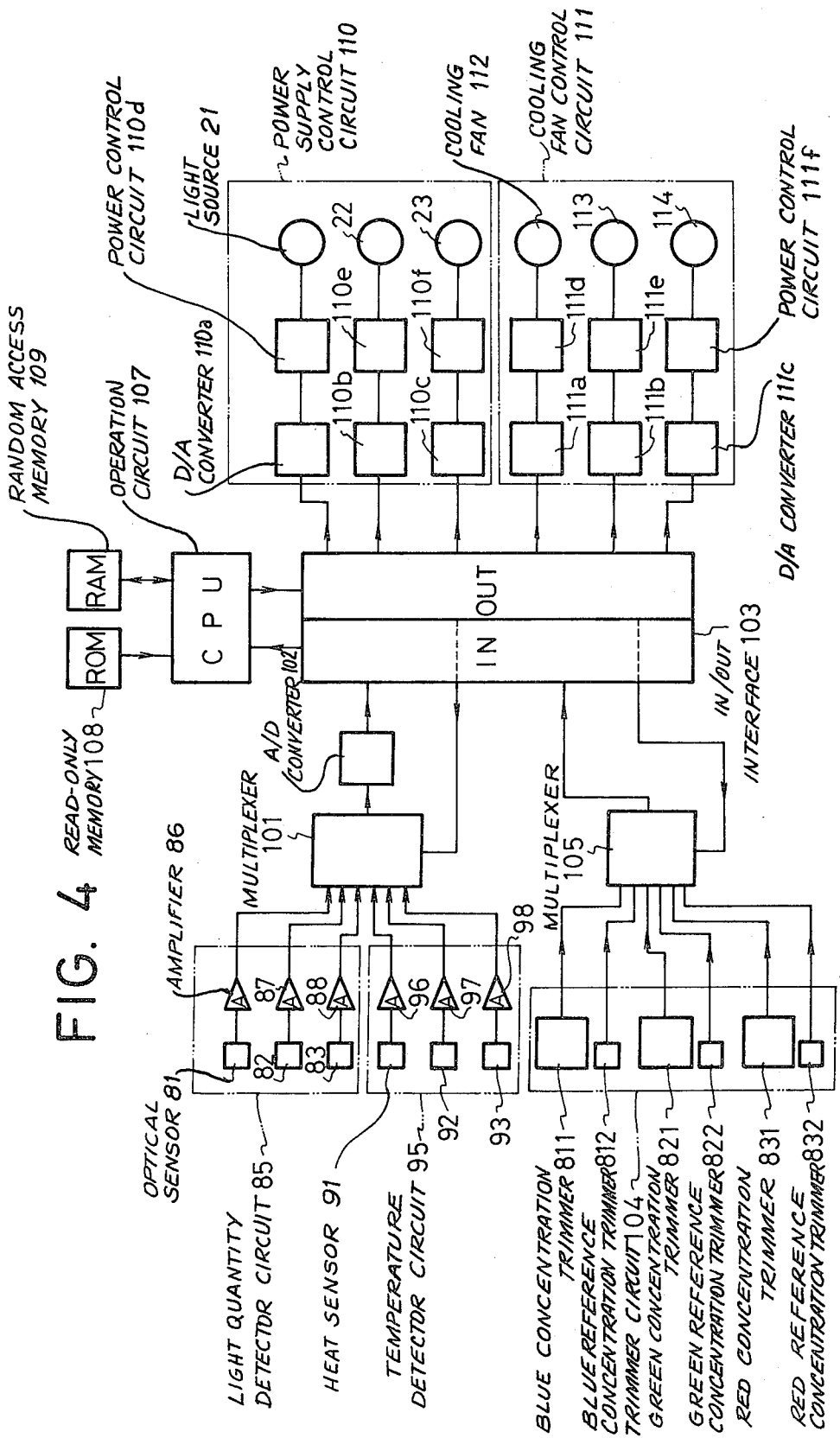
FIG. 4 is a block diagram of an embodiment of the light quantity control circuit of the invention.

FIG. 4 shows an electric circuit including a light quantity detector circuit 85, which constitutes a portion of the light quantity control circuit and includes optical sensors 81, 82 and 83 and amplifiers 86, 87 and 88. A temperature detector circuit 95, constitutes a portion of the cooling fan control circuit and consists of heat sensors 91, 92 and 93 and amplifiers 96, 97 and 98. The signals from the optical sensors 81, 82 and 83 and from the heat sensors 91, 92 and 93 are amplified by the amplifiers 81, 82 and 83, and 91, 92 and 93, respectively, and are fed to a multiplexer 101. The input signals are successively selected by the multiplexer 101 and are applied to an analog-to-digital or A/D converter 102.

The signals from the A/D converter 102 are fed to an input/output or IN/OUT interface 103. On the other hand, the signals from a trimmer circuit 104 are also fed to the IN/OUT interface 103 via a multiplexer 105. The trimmer circuit 104 includes a blue concentration trimmer 811, a green concentration trimmer 821 and a red concentration trimmer 831 for selectively setting the concentrations for blue, green and red, respectively, and a blue reference concentration trimmer 812, a green reference concentration trimmer 822 and a red reference concentration trimmer 832 for setting reference concentrations for blue, green and red, respectively, depending upon the photosensitive characteristics of the negative film N. All of the data signals fed to the IN/OUT interface are supplied to an operation circuit 107, wherein the signals are successively operated according to instructions from a read-only memory 108 and a random access memory 109.

Calculated signals for blue, green and red are fed to a power supply control circuit 110, which is part of the light quantity control circuit, and to a cooling fan control circuit 111 via the IN/OUT interface 103. The light quantity control circuit includes D/A converters 110a, 110b, 110c, 111a, 111b and 111c, power control circuits 110d, 110e, 110f, 111d, 111e and 111f and cooling fans 112, 113 and 114 for blue, green and red lamps, respectively.

In the lamp housing of the invention, beams from the light sources 91, 92 and 93 pass through the dichroic filters 31, 32 and 33, respectively. The light is not irregularly reflected or scattered, but is received by the beam guiding member 6 and guided to the end surface 61a of said beam guiding member. A high transmission efficiency is maintained. Furthermore, since the fibers 62a, 63a and 64a of the branched bundles 62, 63 and 64 are arrayed evenly and at random in the main bundle 61, the beams or rays of three primary colors are evenly emitted from the end surface 61a of the beam guiding member 61. Also, the light transmission factor is not changed, regardless of how the flexible optical fibers are bent within their limits. Accordingly, the flexible optical fibers need be secured only at the portion where the light is introduced and at the portion from which the light is emitted; the intermediate portions being suitably bent. The flexible fibers may therefore be easily mounted in the casing 1 and are simply and easily repaired.

Quantities of light from the light sources 21, 22 and 23 are detected by the sensors 81, 82 and 83, fed back, and compared with a set value signal of the trimmer circuit 104. The voltages of the light sources are then increased or decreased, depending upon the calculated results. The temperatures of the halogen lamps functioning as the light sources change in accordance with the variation of the voltages of said lamps. In order to maintain the temperature constant, therefore, the cooling fans 112, 113 and 114 are energized in response to the change in the lamp voltqges, thereby controlling the flow of air. When incandescent lamps are used as the light sources 21, 22 and 23, instead of halogen lamps, the cooling fans may be operated at a constant speed, or may be dispensed with.

Due to the aforedescribed control operation of the lamp housing of the invention, light quantities of the three light sources 21, 22 and 23 may be automatically adjusted simply by setting the reference concentration trimmers 811, 821 and 831 in accordance with the characteristics of the negative film N, and setting the selective trimmers 812, 822 and 832 to desired concentrations.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electrically controlled additive lamp housing for optical printing, said lamp housing comprising
    first, second and third light sources;
    first, second and third dichroic filters positioned at corresponding ones of the first, second and third light sources for deriving red, green and blue beams, respectively, from said light sources;
    a beam guide member having first, second and third branched bundles and a main bundle composed of said first, second and third branched bundles, each branched bundle having an end surface at which a corresponding one of said beams derived from said dichroic filters is provided, and said main bundle having an end surface for emitting said beams; and
    a light quantity control circuit for controlling the quantities of light of said light sources.

2. A lamp housing as claimed in claim 1, wherein said beam guide member consists of a bundle of optical fibers.

3. A lamp housing as claimed in claim 2, wherein said optical fibers are glass fibers.

4. A lamp housing as claimed in claim 2, wherein said optical fibers are glass fibers having quartz cores.

5. A lamp housing as claimed in claim 2, wherein said optical fibers are plastic fibers.

6. A lamp housing as claimed in claim 2, wherein the end surface of said main bundle consists of end surfaces of sets of optical fibers arrayed in a random fashion, each said set having three optical fibers guided from said first, second and third branched bundles, respectively.

7. A lamp housing as claimed in claim 2, wherein the light quantity control circuit includes light quantity monitoring sensor circuits, preset concentration trimming circuits and operation circuits for each of said light sources, said light quantity control circuit controlling the quantities of light from said light sources.

8. A lamp housing as claimed in claim 7, wherein a predetermined number of optical fibers are derived from each of the branches to form fourth, fifth and sixth guide bundles functioning as monitoring bundles, each of the guide bundles having an end portion, and sensors provided at the end portion of each of said guide bundles.

9. A lamp housing as claimed in claim 8, wherein said light sources consist of halogen lamps.

* * * * *